United States Patent
Wittebrood (12) 
(10) Patent No.: US 6,599,645 B2
(45) Date of Patent: Jul. 29, 2003

(54) COMPOSITE METAL PANEL

(75) Inventor: Adrianus Jacobus Wittebrood, Velserbroek (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 10/042,752

(22) Filed: Dec. 20, 2002

(65) Prior Publication Data

US 2003/0091856 A1 May 15, 2003

Related U.S. Application Data

(63) Continuation of application No. 09/986,475, filed on Nov. 8, 2001, now abandoned, which is a continuation-in-part of application No. 09/573,980, filed on May 19, 2000, now Pat. No. 6,379,818.

(30) Foreign Application Priority Data

Nov. 10, 2000 (NL) .............................................. 1016583

(51) Int. Cl.$^7$ .......................... B32B 15/20; B23K 31/02
(52) U.S. Cl. ...................... 428/654; 228/181; 228/219; 228/221; 228/254; 228/262.1; 228/262.51; 428/646; 428/647; 428/650; 428/652; 428/655; 428/656; 428/658; 428/674; 428/675; 428/680; 428/116; 428/182; 428/184; 428/186; 428/926; 428/935
(58) Field of Search ................................ 428/654, 646, 428/647, 650, 652, 655, 656, 658, 674, 675, 680, 116, 182, 184, 186, 926, 935; 228/181, 219, 221, 254, 262.1, 262.51

(56) References Cited

U.S. PATENT DOCUMENTS 2,821,014 A 1/1958 Miller
3,482,305 A 12/1969 Dockus et al.
3,597,658 A 8/1971 Rivera (List continued on next page.)

FOREIGN PATENT DOCUMENTS

| DE | 3821073 | 1/1989 |
|----|---------|--------|
| EP | 0227261 | 7/1987 |
| FR | 2354171 | 1/1978 |
| FR | 2617868 | 1/1989 |
| GB | 1176688 | 1/1970 |
| GB | 2182703 | 5/1987 |
| JP | 07024944 | 1/1995 |
| JP | 07144380 | 6/1995 |
| WO | 0026020 | 5/2000 |
| WO | 0071784 | 11/2000 |

OTHER PUBLICATIONS

U.S. patent application Ser. No. 09/801,840, filed Mar. 9, 2001, Adrianus Jacobus Wittebrood et al.

(List continued on next page.)

Primary Examiner—Robert R. Koehler
(74) Attorney, Agent, or Firm—Stevens, Davis, Miller & Mosher, LLP (57) ABSTRACT

The invention relates to a rigid composite metal panel comprising at least two metal parallel plates and/or sheets secured to the peaks and troughs of a corrugated aluminium stiffener sheet arranged between the parallel plates and/or sheets, wherein the corrugated aluminium stiffener sheet is an aluminium brazing sheet product made from an aluminium brazing sheet product including a core sheet (1) made of an aluminium alloy having on at least one surface of the core sheet clad, and preferably on both sides, an aluminium clad layer (2), the aluminium clad layer being made of an aluminium alloy comprising silicon in an amount in the range of 2 to 18% by weight, preferably 5 to 14%, and a layer (3) comprising nickel on the outer surface of the aluminium clad layer. The invention further relates to a method of manufacturing thereof.

33 Claims, 3 Drawing Sheets

U.S. PATENT DOCUMENTS

| | | | |
|---|---|---|---|
| 3,963,454 | A | 6/1976 | Singleton, Jr. |
| 3,970,237 | A | 7/1976 | Dockus |
| 4,028,200 | A | 6/1977 | Dockus |
| 4,157,154 | A | 6/1979 | Scott et al. |
| 4,164,454 | A | 8/1979 | Schober |
| 4,388,159 | A | 6/1983 | Dockus et al. |
| 4,602,731 | A | 7/1986 | Dockus |
| 4,721,653 | A | 1/1988 | Oda et al. |
| 5,069,980 | A | 12/1991 | Namba et al. |
| 5,232,788 | A | 8/1993 | Timsit et al. |
| 5,422,191 | A | 6/1995 | Childree |
| 5,466,360 | A | 11/1995 | Ehrsam et al. |
| 5,601,695 | A | 2/1997 | Muranushi |
| 5,821,506 | A | 10/1998 | Matsen |
| 6,054,200 | A | 4/2000 | Woods |
| 6,129,262 | A | 10/2000 | Cooper et al. |

OTHER PUBLICATIONS

U.S. patent application Ser. No. 09/985,945, filed Nov. 6, 2001, Adrianus Jacobus Wittebrood et al.

Wernick and Pinner, "The Surface Treatment and Finishing of Aluminium and its Alloys", $5^{th}$ Edition, vol. 1, pp. 181–182 and pp. 191–203 (1988) (no month).

Wernick and Pinner, "The Surface Treatment and Finishing of Aluminium and its Alloys", $5^{th}$ Edition, vol. 2, pp. 1006–1022 and pp. 1023–1071 (Ch. 14–15)(1988) (no month).

SAE Paper No. 880446 by B.E. Cheadle and K.F. Dockus, "Inert Atmosphere Fluxless Brazing of Aluminium Heat Exchangers" ICE, Detroit, Michigan, Feb. 29–Mar. 4, 1988, pp. 1–11.

Bureau of Mines Technology, "Aluminium Soft–Soldering", 2301 N.T.I.S. Tech Notes (manufacturing), XP–002119816, 1985, Jan. No. 1G, Springfield, VA pp. 12–13.

Adrianus Jacobus Wittebrood, Jacques Hubert Olga Joseph Wijenberg, Joop Nicolaas Mooij, "Nickel–plated Aluminium Brazing Sheet", Research Disclosure, No. 439, pp. 1946–1947 (Nov. 2000).

COMPOSITE METAL PANEL

CROSS-REFERENCE TO RELATED APPLICATIONS

This is a continuation, claiming priority under 35 U.S.C. Section 120 of U.S. patent application Ser. No. 09/986,475, filed Nov. 8, 2001, abandoned, which is a continuation-in-part, claiming priority under 35 U.S.C. Section 120 of U.S. patent application Ser. No. 09/573,980, filed May 19, 2000, now U.S. Pat. No. 6,379,818, both are incorporated herein by reference in their entirety.

FIELD OF THE INVENTION

The invention is concerned with a composite rigid metal panel comprising at least two parallel metal plates and/or sheets secured to a corrugated aluminium stiffener sheet arranged between the parallel metal plates and/or sheets, and further to a composite panel comprising two parallel plates and/or sheets secured to aluminium stiffener sheet having a honeycomb structure. The invention further relates to a method of manufacturing thereof.

DESCRIPTION OF THE RELATED ART

Composite metal panels having an interior honeycomb structure are usually manufactured by means of adhesion bonding, such as for example disclosed in U.S. Pat. No. 6,054,200. Composite metal panels having an interior of corrugated sheet such that the peaks and troughs thereof are bonded to the parallel metal plates are usually manufactured by means of adhesion bonding or by welding techniques, such as by laser welding techniques as disclosed in for example international application WO-00/26020. The stiffness of the composite metal panel is to a large extent the resultant of the design of the corrugated sheet or of the honeycomb structure.

Composite metal panels are being used in load bearing structures such as for the floor or cargo decks of a ship, tooling board, floor or wall panels of an aircraft or a land-transportation vehicle, e.g. a truck or a car, architectural panels, energy absorption purposes, or for the construction of interior or exterior walls of a building. There is a demand for an all metal composite panel construction, preferably a light-weight metal panel, and which is easy to manufacture.

SUMMARY OF THE INVENTION

It is an object of the present invention to provide a composite metal panel which is easy and reliable to manufacture.

It is a further object of the present invention to provide a composite metal panel which can be manufactured by means of brazing.

It is a further object of the present invention to provide a composite metal panel in which the parallel metal plates and/or sheets may be dissimilar to each other and/or dissimilar to the aluminium stiffener sheet.

It is a further object of the present invention to provide a composite metal panel having aluminium stiffener sheet which may be employed both as corrugated sheet and as a honeycomb-like structure.

According to the invention in one aspect there is provided a rigid composite metal panel including at least two metal parallel plates and/or sheets secured to the peaks and troughs of a corrugated aluminium stiffener sheet arranged between the parallel plates and/or sheets, characterized in that the corrugated aluminium stiffener sheet is an aluminium brazing sheet product made from an aluminium brazing sheet product including a core sheet (1) made of an aluminium alloy having on at least one surface of the core sheet clad, and preferably on both sides, an aluminium alloy clad layer (2), the aluminium alloy clad layer being made of an aluminium alloy comprising silicon in an amount in the range of 2 to 18% by weight, preferably 5 to 14%, and a layer (3) including nickel on the outer surface of said aluminium alloy clad layer.

According to the invention in another aspect there is provided a rigid metal composite panel including at least two parallel metal plates and/or sheets secured to aluminium stiffener sheet having a honeycomb structure arranged between the parallel plates and/or sheets, characterized in that the corrugated aluminium stiffener sheet is made from an aluminium brazing sheet product including a core sheet (1) made of an aluminium alloy having on at least one surface of the core sheet clad, and preferably on both sides, an aluminium alloy clad layer (2), the aluminium alloy clad layer being made of an aluminium alloy comprising silicon in an amount in the range of 2 to 18% by weight, preferably 5 to 14%, and a layer (3) including nickel on the outer surface of said aluminium alloy clad layer.

By the invention it is possible to provide a light-weight all-metal composite metal panel which is very rigid, and may be used for various load-bearing constructions. By the invention it is possible to provide a composite metal panel which may be bonded or secured together in a simple and reliable manner by means of a brazing operation, in particular under controlled atmosphere brazing ("CAB") conditions in the absence of a brazing flux material, such as the commonly known NOCOLOK (trade name) brazing flux material. It has been found that the aluminium brazing sheet product used may be formed into corrugated sheet of various shape by means of, e.g., roll-forming, and may also be formed into a honeycomb-like shape. Suitable corrugated sheets have for example the shape of flat peaks and troughs, a dovetail shape or curved peaks and troughs. A suitable honeycomb-like structure may be formed for example from two or more corrugate stiffener sheets each with flat peaks and troughs and whereby the peak of one sheet is brazed to the trough of the other corrugated sheet. The rigid honeycomb-like structure will be formed in the same brazing operation as in which the honeycomb-like structure is bonded by means of brazing to the parallel metal plates or sheets. Furthermore, the use of the present brazing sheet product for the manufacture of composite metal panels allows for a honeycomb core having various number of various density honeycomb portions, due to variations in densities or other cell sizes.

In an embodiment of the composite metal panel according to the invention the corrugated aluminium stiffener sheet is in the form of turbulator sheet, and thereby allowing to design and to manufacture particular rigid metal composite panels. Turbulator sheet is an expression known in the art for manufacturing heat exchangers.

In an embodiment of the composite metal panel according to the invention the corrugated aluminium stiffener sheet is a formed sheet having a plurality of cup-like cavities, which cup-like cavities are aligned in essentially parallel rows and whereby in alternating parallel rows the openings of the cup-like cavities are facing opposed directions. The tip surfaces of the cup-like cavities form the peaks or alternatively the troughs of the corrugated stiffener sheet, and the tip surfaces are joined by brazing to the parallel metal plates or sheets. The tip surfaces may be flattened in order to increase the contact surface area with the parallel metal plates or sheets, and thereby increasing the strength of the joint after brazing. The cup-like cavities may have several forms, such as circular, cylindrical, spherical or cone-shaped. Corrugated stiffener sheet of this type allows for the design and manufacture of composite metal panels with improved stiffness in multiple directions. Corrugated stiffener sheets having such a structure are known in the art per se and are in particular applied as heat-shields in cars and trucks, in which known application the sheet material is made from one aluminium alloy only and is not made of brazing sheet, and in particular not of brazing sheet comprising a core sheet having multiple metal layers of different composition.

In an embodiment of the aluminium brazing sheet product said layer comprising nickel further comprises bismuth in a range of at most 5% by weight.

In accordance with the invention it has been found surprisingly that the nickel layer does not need to comprise any lead as a mandatory alloying addition in order to achieve good brazeability. Surprisingly it has been found that equal or even better results can be obtained if bismuth is added to the nickel layer, such that the nickel layer can be kept essentially lead-free and simultaneously also in the plating bath used for the deposition of this Ni—Bi layer. This is of particular relevance since the use of lead for manufacturing brazed components and used in various market areas is undesirable and it is envisaged that in the near future there might possibly even be a ban on lead comprising products or products manufactured via one or more intermediate processing steps comprising lead or lead-based components.

Preferably in this aluminium brazing sheet product the layer comprising nickel or nickel-bismuth has a thickness of at most 2.0 $\mu$m, preferably of at most 1.0 $\mu$m, and more preferably of at most 0.5 $\mu$m. A coating thickness of greater than 2.0 $\mu$m requires a prolonged treatment time for plating, and may result in wrinkling of the molten filler material during subsequent brazing. A preferred minimum thickness for this Ni—Bi-containing layer is about 0.25 $\mu$m. Also other techniques such as thermal spraying, Chemical Vapor Deposition ("CVD") and Physical Vapor Deposition ("PVD") or other known techniques for depositing of metals or metal alloys from a gas or vapor phase may be used.

In an embodiment of the aluminium brazing sheet product the aluminium clad layer is of an AA4000-series aluminium alloy comprising Si in a range of 2 to 18% by weight, and preferably 5 to 14%, and further at least Mg in a range of at most 8% by weight, and preferably at most 5%, and more preferably in a range of 0.05 to 2.5% by weight.

In an embodiment, the aluminium brazing sheet product according to the invention is further characterized by a layer comprising zinc or tin as a bonding layer between the outer surface of the aluminium clad layer and the layer comprising nickel. By the zinc or tin-comprising bonding layer a very effective bond between the aluminium alloy clad layer and the layer comprising nickel is formed, the bond remaining effective during subsequent deformation of the aluminium brazing sheet, for example by roll forming to obtain a corrugate stiffener sheet. The coverage of the nickel layer is no longer dependent on the surface characteristics of the bare clad layer. The aluminium brazing sheet product is suitable for fluxless brazing under controlled atmosphere conditions. This part of the invention is based in part on the insight that to obtain a well-bonded nickel layer on the Si-containing aluminium clad layer of the brazing sheet product, so that the bond remains effective under large deformation, pre-treatment of the aluminium clad layer is extremely important when manufacturing complex shapes of corrugated sheet. The prior art processes apparently aimed at applying the nickel in a distributed form, principally to the silicon particles at the surface of the aluminium clad layer, rather than trying to achieve a uniform nickel-lead layer. In the present invention the surface of the Si-containing aluminium clad alloy is altered in such way that the nickel coverage is independent of the silicon particles at its surface. The nickel plating does not take place on the silicon particles but on the applied thin bonding layer comprising zinc or tin. Since the nickel thus is deposited on the total surface of the aluminium alloy clad layer the necessary reaction before brazing can take place much more easily as compared to the process of the prior art. The zinc or tin applied does not interfere at all during the brazing process, and may contain a component to assist the brazing. Since the nickel is deposited smoothly and uniformly on the surface, the use of lead to promote wetting during brazing can be reduced or avoided, or other elements such as bismuth may be used for this purpose. A further important advantage of the nickel deposited smoothly and uniformly on the surface is that the total amount of nickel to be applied in order to achieve good fluxless brazing can be reduced.

Preferably the applied thin bonding layer comprising zinc or tin has a thickness of at most 0.5 $\mu$m, more preferably at most 0.3 $\mu$m (300 nm), and most preferably in the range of 0.01 to 0.15 $\mu$m (10–150 nm). In the best results obtained a thickness of about 30 nm has been used. A coating thickness of more than 0.5 $\mu$m requires a prolonged treatment time, e.g. for displacement plating, and is thought to have no further advantages for improving the adhesion.

In an embodiment the aluminium brazing sheet is characterized in that the bonding layer comprising zinc or tin is applied by a direct zinc plating treatment, or by a zincate treatment or a stannate treatment. Very good results may be obtained with an immersion zincate treatment or immersion stannate treatment, often also referred to as displacement plating. A further advantage is that this treatment lends itself to application in a continuous process operation.

Zincate treatments are known per se in the art for applying layers onto aluminium. Stannate treatments are known in the art for depositing a layer on aluminium to facilitate soldering, to improve electrical conductivity, and also to give a lubricated surface to aluminium alloy pistons for internal combustion engines during the running-in period.

The zinc or tin layer applied may be essentially a pure zinc or tin layer or may be primarily zinc or tin (e.g. at least 50 weight %). Minor amounts of impurity elements or deliberately added elements may be present, as discussed in more detail below. Typically impurity elements are present at less than 10%, more usually less than 5% by weight in the zinc or tin layer. The zinc or tin layer may contain less than 1% of other elements.

In an embodiment of the aluminium brazing sheet product each aluminium alloy clad layer has a thickness ranging from about 2 to 20% of the total thickness of the total brazing sheet product thickness. Typical aluminium clad layer thickness is in the range of 40 to 80 micron. The core sheet has a thickness typically in a range of at most 5 mm, more preferably in the range of 0.1 to 2.5 mm.

The core sheet of the aluminium brazing sheet product is preferably made of an aluminium alloy, such as those of the AA3000, AA5000, and AA6000-series aluminium alloys.

In a further embodiment of the composite metal panels according to the invention, the aluminium brazing sheet product comprising a core sheet being made of an aluminium alloy having on at least one surface of the core sheet clad with, and preferably on both sides, an aluminium clad layer being made of an aluminium alloy (typically an AA4000-series alloy) comprising silicon in an amount in the range of 2 to 18% by weight, and preferably 5 to 14%, a layer comprising nickel on the outer surface of the aluminium alloy clad layer, and a separately deposited metal layer on one side of the layer comprising nickel, and the separately deposited metal layer comprising a metal such that taken together the aluminium alloy clad layer and all layers of the aluminium brazing sheet product exterior thereto form a metal filler having a liquidus temperature in the range of 490 to 570° C., and preferably in the range of 510 to 550° C.

With this aluminium brazing sheet product according to the invention there is provided a brazing sheet product which may be brazed at significantly lower temperatures as compared to traditional brazing temperatures, typically in the range of 575 to 600° C., while still achieving a very strong and reliable bonding. This brazing sheet product may be applied in both vacuum brazing and fluxless brazing under controlled atmosphere conditions, but there is a preference for the application of fluxless CAB conditions. Such a brazing sheet product may be manufactured on an industrial scale without the laborious use of thin metal foils or sheets, which are difficult to manufacture themselves. With this aluminium brazing sheet product it is possible the braze also more unusual metals to each other into a composite metal panel, for example aluminium sheet made of AA5000-series alloys having Mg in a range of at most 6.0 weight percent may be used, such as, but not limited thereto, AA5052, AA5056, AA5083 and AA5059.

In an embodiment, on at least one side of the core sheet the layer comprising a metal such that taken together the aluminium clad layer and all layers exterior thereto form a metal filler having a reduced liquidus temperature, comprises copper or copper-based alloy, and more preferably the layer comprises at least 60% by weight copper. Suitable copper-based alloys may be for example brass or bronze.

Preferably the applied layer comprising copper or copper-based alloy has a thickness of at most 10 micron, more preferably of at most 7 micron. In the best results a thickness of about 4 micron has been used.

In particular copper has been found to significantly reduce the liquidus temperature of the resultant metal filler. However, further metal layers may be applied in addition thereto.

In an embodiment the aluminium brazing sheet is characterized in that the layer comprising copper or copper-based alloy is deposited by electroplating. However, other techniques such as thermal spraying, plasma spraying, CVD, PVD or other known techniques for depositing of metals or metal alloys from a gas or vapor phase may be used.

In an embodiment the layer comprising copper or copper-based alloy being deposited by plating copper or copper-alloy using an aqueous alkaline copper-cyanide based plating bath.

In an embodiment the layer comprising copper or copper-based alloy being deposited by plating copper or copper-alloy using an aqueous copper-phosphate based plating bath. This aqueous plating bath demonstrated to be operational in a wide pH range, and can be used on industrial scale plating lines using a high current density, which in turn allows for fairly high line speeds. It can be composed using standard and readily available chemicals, and copper can easily be replenished to the plating bath.

An embodiment of the aluminium brazing sheet product is characterized in that taken together the aluminium clad layer and all layers exterior thereto, have a composition comprising at least, by weight percent:

Si in the range of 5 to 10%, preferably 7 to 10%,
Cu in the range of 12 to 25%, preferably 12 to 18%,
Bi in the range of at most 0.25%, preferably 0.02 to 0.25%,
Ni in the range of 0.05 to 4%, preferably 0.05 to 3.0%,
Zn in the range of at most 20%, preferably at most 10%, more preferably at most 0.25%,
Sn in the range of at most 5%,
Mg in the range of at most 5%,
balance aluminium and impurities.

A typical impurity element may be iron, in particular originating from the aluminium clad layer, and which may be tolerated in an amount of at most 0.8%. Other alloying elements may be present, and will typically, but not exclusively, originate from the aluminium clad layer. In this embodiment a metal filler is obtained which has a liquidus temperature in the range of 510 to 550° C., and allows for the manufacturing of composite metal panels at significant lower temperatures compared to traditional industrial scale brazing temperatures for devices such as heat exchangers, and thereby allowing for a more unconventional choice of aluminium alloys, namely including those having low melting point constituents, for the parallel plates or sheets for the composite metal panel.

In an advantageous embodiment the aluminium brazing sheet is characterized in that the layer comprising nickel is deposited by electroplating both nickel and bismuth using an aqueous lead-free bath comprising a nickel-ion concentration in a range of 10 to 100 g/l and a bismuth-ion concentration in the range of 0.01 to 10 g/l, and more preferably by plating both nickel and bismuth using an aqueous lead-free bath comprising a nickel-ion concentration in a range of 20 to 70 g/l and a bismuth-ion concentration in the range of 0.02 to 5 g/l.

In this aspect of the invention it has been found surprisingly that the nickel layer does not need to comprise any lead as a mandatory alloying addition in order to achieve good brazeability. Surprisingly it has been found that equal or even better results can be obtained if bismuth is added to the nickel layer, such that the nickel layer can be kept essentially lead-free and simultaneously also the plating bath used for the deposition of this Ni—Bi layer. By using this aqueous lead-free plating bath the need for the addition of lead has been overcome, which is a significant achievement from an environmental point of view.

The nickel-ion concentration to the aqueous bath can be added via the addition of nickel chloride, nickel fluoborate, nickel sulfamate, nickel acetate or nickel sulphate. However, there is a preference to use the addition of nickel sulphate ($NiSO_4$). At a too high level of nickel salt in the aqueous bath there is the risk of the crystallization of the salt in the solution, which might damage a continuous process. At too low levels the resultant bath becomes uneconomical due to too long plating times and low current density.

Bi-ion in the concentration set out above can be added in various ways to the aqueous bath. In theory many bismuth compounds could be used for this purpose. However, many bismuth compounds have been tried out but only very few appear to provide reliable and reproducible results. For example the addition of bismuth acetate has been tried, but it has been found that this compound did not dissolve in the plating bath used, whereas the addition of lead acetate did not result in any problems with respect to having this compound dissolved. For example also the combination of a bath of nickel-ions and bismuth-ions and a tartrate at a pH in the range of more than 8 resulted in the formation of an undesirable Ni containing sludge. This Ni containing sludge did not dissolve upon heating, indicating amongst others that Ni is unstable in the presence of a tartrate in the mentioned pH range. In accordance with the invention very good results have been obtained when Bi-ions are being added via the addition of one or more of the group consisting of bismuth carbonate ($Bi_2(CO_3)_3$), bismuth oxide ($Bi_2O_3$), bismuth citrate ($BiC_6H_5O_7$) and bismuth chloride ($BiCl_3$). By using bismuth carbonate or bismuth oxide in the presence of nickel a suitable plating bath has been obtained which is stable at a very wide pH range. At too high levels of Bi-ion concentration in the aqueous bath the resultant deposit has an undesired high Bi-concentration. Preferably the Bi-concentration in the resultant Ni—Bi layer on the brazing sheet product is not more than 5 percent by weight, and preferably not more than 3 percent by weight. At too low levels the resultant bath becomes uneconomical due to too long plating times and low current density.

Plating baths using the following salts have proved particularly effective, in grams per liter:

Nickel sulphate in a range of 45 to 450 g/l, and preferably 90 to 315 g/l,

Chloride-ion concentration in a range of 1 to 50 g/l, and preferably 1 to 30 g/l, Sodium citrate in a range of 55 to 180 g/l, and preferably 110 to 150 g/l, Sodium gluconate in range of 2 to 90 g/l, and preferably 5 to 55 g/l, Ammonium sulphate in a range of at most 270 g/l, Bismuth oxide in a range of 0.02 to 22 g/l, and preferably 0.05 to 11 g/l, or Bismuth carbonate in a range of 0.03 to 29 g/l, and preferably 0.06 to 14 g/l.

The addition of an ion from the group consisting of chloride and fluoride is required for inducing anode corrosion.

The plating bath used can operate in a wide pH range of 2.5 to 10, and preferably in the range of 4 to 8, without affecting the properties of the bath and without dissolving the aluminium clad layer.

In an embodiment, the composite metal panel is characterized in that one or more of the parallel metal plates or sheets is made from a metal selected from the group consisting of aluminium, aluminium alloy, titanium, plated or coated titanium, bronze, brass, stainless steel, plated or coated stainless steel, low-carbon steel, plated or coated low-carbon steel, high-strength steel, and plated or coated high-strength steel, nickel or nickel-alloy. An example of a suitable plated stainless steel sheet or plate is copper plated material. Suitable stainless steel grades are those with 0.01 to 0.35 weight % carbon and 11 to 27% by weight Cr, as defined by the international steel numbers, like Ferritic grades, for example ASTM 409, 410S, 430; Martensitic grades, for example ASTM 420; Duplex grades, for example ASTM 329, S31803; Austenitic grades, for example. ASTM 301, 304L, 321, 316L; heat and creep resisting grades, for example ASTM 309S, 304H.

In accordance with the invention it has been found that the aluminium brazing sheet product as set out above may be joined to the parallel plates or sheets of various metals by means of brazing, in particular in an inert atmosphere brazing (CAB) process in the absence of a brazing-flux material. The parallel plate or sheets may be formed from aluminium alloys, such as but not limited to, from the AA3000-series alloys being frequently used in conventional brazing operations, but also from for brazing more unusually aluminium alloys from the AA5000-series having magnesium as an essential alloying element in a range of at most 6 weight percent, and also aluminium alloys from the AA6000-series. The composite metal panel may also be formed in only one brazing cycle from different metal combination, for example one parallel metal sheet or plate is made from copper-plated stainless steel and the other parallel metal sheet or plate is made from low-carbon steel by using the aluminium brazing sheet product set out above.

In a further aspect of the invention there is provided a method of manufacturing rigid composite metal panels as set out above. The method of manufacturing the rigid composite metal panel, includes the steps of:

(a) providing parts of at least two parallel metal plates and/or sheets and a corrugated aluminium stiffener sheet which is made from the aluminium brazing sheet product of the invention set out above;

(b) assembling the parts into an assembly such that the aluminium stiffener sheet is arranged between the parallel metal plates and/or sheets;

(c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each of the parallel metal plates and/or sheets and the corrugated aluminium stiffener sheet;

(d) cooling of the joined composite metal panel.

In the method, fluxless CAB operation is preferred.

BRIEF DESCRIPTION OF THE DRAWINGS

The invention will now be illustrated by a non-limitative example, and with reference to the drawings, wherein.

DETAILED DESCRIPTION OF THE PREFERRED EMBODIMENTS

Figure 1:
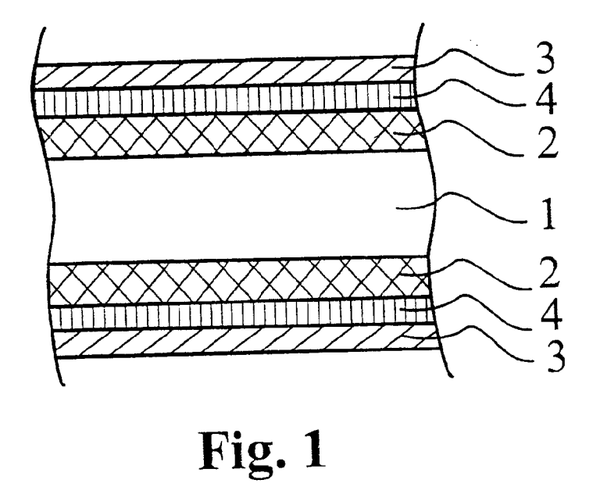
FIG. 1 is a schematic longitudinal section showing the aluminium brazing sheet product used in the composite metal panel according to the invention.

FIG. 1 shows schematically a brazing sheet product used in a composite metal panel according to the invention. The brazing sheet product includes an aluminium core sheet (1) on both sides clad with an aluminium alloy clad layer (2), a layer (3) comprising nickel or nickel-bismuth on the outer surface of the aluminium alloy clad layer (2), and a thin bonding layer (4) comprising zinc or tin between the layers (2) and (3). The composition and the thickness of the various layers and their advantages have been set out above.

Figure 2:
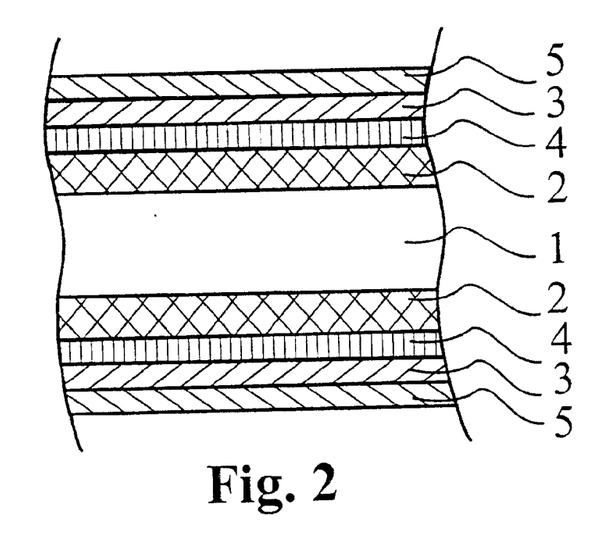
FIG. 2 is a schematic longitudinal section showing the aluminium brazing sheet product used in the composite metal panel according to the invention.

FIG. 2 shows also schematically a brazing sheet product used in a composite metal panel according to the invention. In this embodiment the brazing sheet product of FIG. 1 has been used and whereby on the layer (3) comprising nickel or nickel-bismuth a further metal layer (5), preferably comprising copper, has been deposited to reduce the liquidus temperature of the metal filler formed by the clad layer 1 and all layers exterior thereto on its one side of the aluminium core sheet. The further metal layer (5) may be applied on top of the nickel layer (3) (as shown) or underneath the nickel layer (3) (not shown). The compositions of the various layers and their advantages have been set out above.

Figure 3:
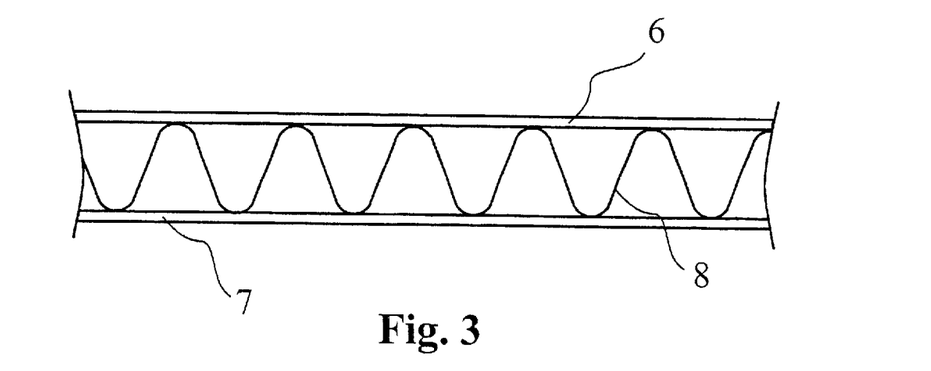
FIG. 3 is a schematic cross-section of a composite metal panel according to the invention.

FIG. 3 is a schematic cross-section of a composite metal panel according to the invention comprising two parallel metal plates or sheets (6,7) joined to each other by brazing of the peaks and troughs of a corrugated aluminium stiffener sheet. The corrugated aluminium sheet formed by the aluminium brazing sheet product set out in FIG. 1 or 2 is V-shaped.

Figure 4:
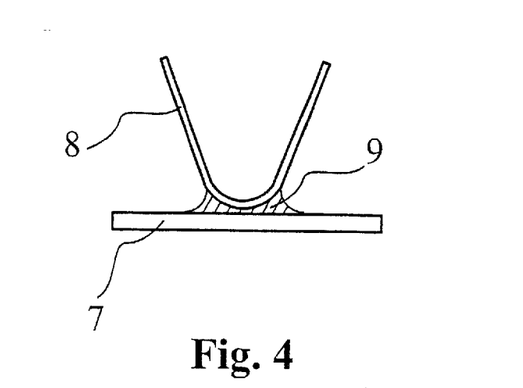
FIG. 4 is a schematic cut-out cross-section of a composite metal panel shown in FIG. 3.

FIG. 4 is a schematic cut-out cross-section of the composite metal panel shown in FIG. 3, and wherein a parallel metal plate or sheet (7) is shown which has been joined to the corrugated aluminium stiffener sheet (8) with a fillet (9) formed after heating to elevated temperature of an assembly of parallel metal plates or sheets and aluminium stiffener sheet, and whereby during heating a molten filler is formed by the aluminium alloy clad layer (2) and all metal layers (3,4,5) exterior to the aluminium alloy clad layer (2), as shown in FIGS. 1 and 2, to form a strong bond or joint between the separate parts.

Figure 5:
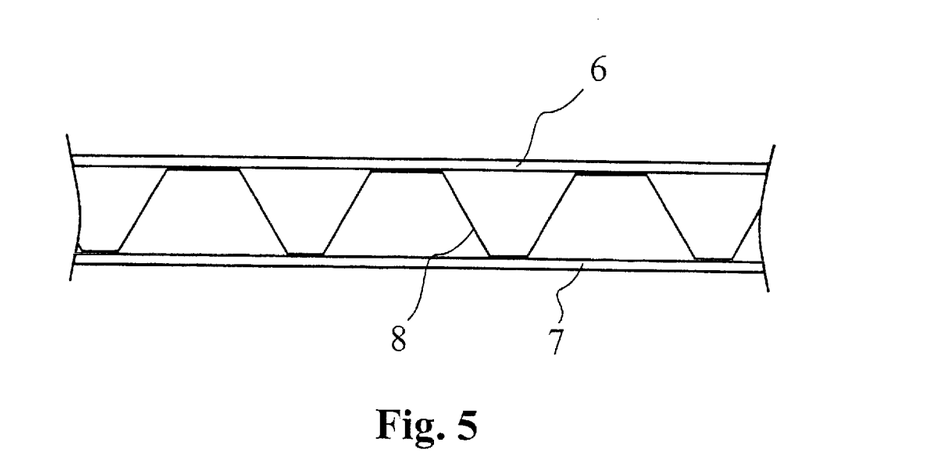
FIG. 5 is a schematic cross-section of a composite metal panel according to the invention.

FIG. 5 is a similar structure as set out for FIG. 3, and wherein the corrugated aluminium sheet (8) formed by the aluminium brazing sheet product set out in FIG. 1 or 2 has flat peaks and troughs.

Figure 6:
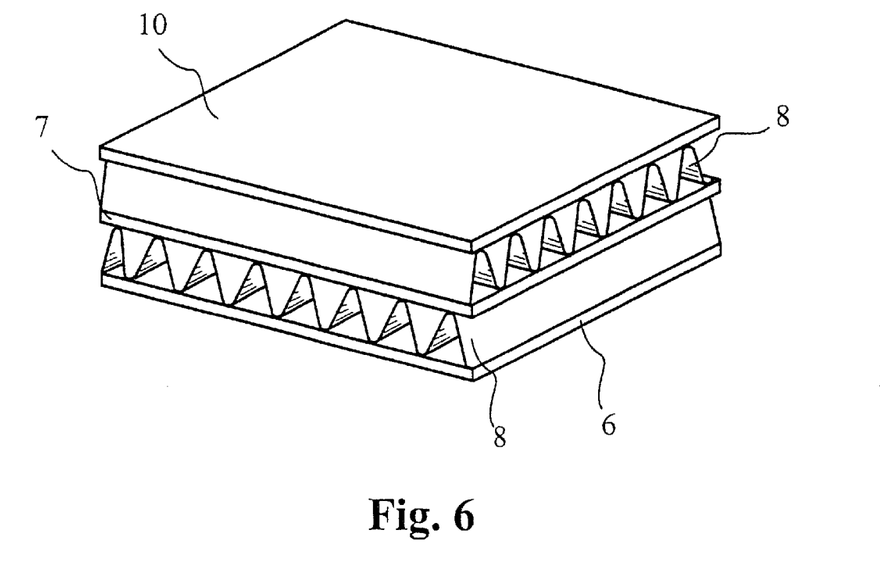
FIG. 6 is a schematic cross-section of a composite metal panel according to the invention.

FIG. 6 is a schematic cross-section of a composite metal panel according to the invention formed by three parallel metal plates or sheets (6,7,10) joined to each other via the peaks and troughs of corrugated aluminium stiffener sheets (8). The corrugated aluminium sheet formed by the aluminium brazing sheet product set out in FIG. 1 or 2 is V-shaped. The two different aluminium stiffener sheets are oriented perpendicular to each other in order to improve on the stiffness of the resultant composite metal panel in different directions. It will be immediately apparent to the skilled person that any angle of orientation between the different aluminium stiffener sheet may be chosen depending upon the desired stiffness of the composite metal panel. The same applies for the shape of the aluminium stiffener sheet.

Figure 7:
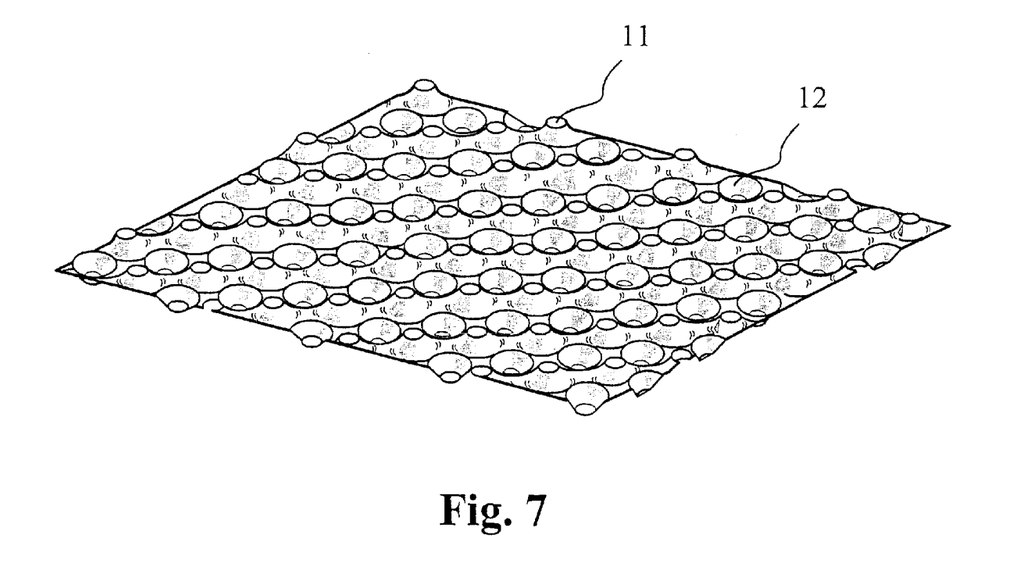
FIG. 7 is a schematic perspective view of a particular shape of corrugated aluminium stiffener sheet in accordance with the invention.

FIG. 7 is a schematic perspective view of a particular shape of corrugated aluminium stiffener sheet in accordance with the invention, whereby the stiffener sheet is a formed sheet having a plurality of cup-like cavities (11,12), which cup-like cavities are aligned in rows and whereby in alternating parallel rows the openings of the cup-like cavities are facing opposed directions. The tip surfaces of the cup-like cavities form the peaks or alternatively the troughs of the corrugated stiffener sheet, and the tip surfaces are joined by brazing to the parallel metal plates or sheets. As shown in FIG. 7 the tip surfaces may be flattened in order to increase the contact surface area with the parallel metal plates or sheets, and thereby increase the strength of the joint after brazing. Depending on the desired stiffness of the composite metal panel, the cup-like cavities may have several forms, such as circular, cylindrical, spherical or cone-shaped. Corrugated stiffener sheet of this type allows for the design and manufacture of composite metal panels with improved stiffness in multiple directions. The distance between two cup-like cavities aligned in the same row may dependent on the application of the composite metal panel, and is typically in the range of 10 to 30 mm. The depth of the cup-like cavities may also be dependent on the application, and is typically in the range of at most 25 mm.

EXAMPLE

On a laboratory scale testing was carried out on industrial scale manufactured aluminium brazing sheet manufactured from an AA3003 core alloy clad on both sides with an AA4045-series clad alloy, having a total thickness of 0.5 mm, the thickness of each clad being 10.9% of the total thickness. The composition of these alloys is given in Table 1.

The brazing sheet was treated by the following sequential process steps:

cleaning by immersion for 180 seconds in ChemTec (trade name) 30014 (a commercial alkaline (etch) degreaser), and rinsing, alkaline etching for 20 sec. in ChemTec (trade name) 30203 (a commercial available alkaline etch cleaner), and rinsing, desmutting for 4 sec. in an acidic oxidising solution, typically 25–50 vol. % nitric acid, comprising ChemTec (trade name) 11093 (a commercial available pickle activator) at ambient temperature, followed by rinsing, zincate immersion using ChemTec (trade name) 024202 for 12 sec. at room temperature resulting in a zinc layer of about 30 nanometer, followed by rinsing, nickel electroplating, and rinsing. The nickel comprising layer has been applied using a nickel plating bath having a composition as set out in Table 2 and having a pH of 5.5. The Bi-ion concentration has been added to the plating bath using a Bi-ion concentrate of 160 g/l sodium hydroxide, 300 g/l sodium gluconate and 111 g/l bismuth oxide. The bismuth oxide could have been replaced also by bismuth carbonate. The electroplating of a Ni—Bi layer was performed at 57° C. using a current density of 6 A/dm$^2$ and a plating time of 25 sec. About 10 g/m$^2$ of nickel was deposited and about 0.5 g/m$^2$ bismuth, being the sum of the applied layers on both sides on the brazing sheet product. The bismuth content of the deposited alloy layer may easily be varied, e.g. by lowering the bismuth concentration in the plating bath to give a lower Bi content.

The aluminium brazing sheet product has been tested for adhesion using the Erichsen dome test (5 mm), and the T-bend test. A value assessment is then given to the adhesion of poor, fair or good. The adhesion of the resultant brazing sheet product has been accessed as good, allowing the aluminium brazing sheet product to be subjected to considerable deformation operations such as typical roll forming operations to obtain the required corrugated stiffener sheet.

Following the adhesion test the aluminium brazing sheet product has been corrugated into a corrugated sheet having V-shaped peaks and troughs, and the space between two peaks was about 20 mm, and the height of the corrugated sheet was about 8.5 mm. The corrugated sheet has been placed between two parallel sheets of AA3003-series material and also between two parallel sheets of copper-plated stainless steel of 304L grade. Each parallel sheet had dimensions of about 20×20 cm and a thickness of about 1 mm. Some pressure was applied to the unbrazed assembly during brazing by putting a load of about 1 kg on the upper parallel metal sheet. The assemblies were put in a brazing furnace and heated under flowing nitrogen, with heating from room temperature to 580° C., dwell time at 580° C. for 1 minute, cooling from 580° C. to room temperature.

Both resultant composite metal panels had an excellent brazed bonding between the parallel sheets and the corrugated aluminium brazing sheet product. Both metal panels were very rigid, which may be further optimised by choosing the shape of the corrugated aluminium stiffener sheet. This experiment demonstrates that by means of a single brazing operation a rigid composite metal panel may be formed using the aluminium brazing sheet product. Furthermore, there is no need to apply an additional additive, such as a commonly used brazing flux material, prior to the brazing operation, and this avoids several laborious processing steps and also avoids the required removal of excess brazing flux material after the brazing operation, which can be difficult with complex shaped aluminium stiffener sheet or composite metal panels having large dimensions. In order to obtain an excellent brazeability there is no need for the mandatory addition of lead to the nickel-layer. Similar or even better results may be obtained using the addition of Bi to the layer comprising nickel. Optionally the bismuth may also be added to the aluminium clad layer.

TABLE 1

| | Weight percent. | |
|---|---|---|
| | AA 3003 | AA 4045 |
| Si | 0.6 max. | 9.0–11.0 |
| Fe | 0.7 max. | 0.8 max. |
| Cu | 0.05–0.20 | 0.30 max. |
| Mn | 1.0–1.5 | 0.05 max. |
| Mg | — | 0.05 max. |
| Zn | 0.10 max. | 0.10 max. |
| Ti | — | 0.20 max. |
| impurities | each 0.05 total 0.15 | each 0.05 total 0.15 |
| balance | aluminium | aluminium |

TABLE 2

| Compound | Concentration [g/l] |
|---|---|
| Nickel sulphate | 142 |
| Ammonium sulphate | 34 |
| Nickel chloride | 30 |
| Sodium citrate | 140 |
| Sodium gluconate | 30 |
| Bismuth ions | 1 |

Having now fully described the invention, it will be apparent to one of ordinary skill in the art that many changes and modifications can be made without departing from the spirit or scope of the invention as herein described. The present invention is defined by the claims appended hereto.

What is claimed is:

1. A rigid composite metal panel comprising at least two parallel metal members, selected from the group consisting of metal plate and metal sheet, secured to the peaks and troughs of a corrugated aluminium stiffener sheet arranged between said parallel metal members, wherein the corrugated aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight, and a layer comprising nickel on an outer surface of said aluminium alloy clad layer.

2. A rigid metal composite panel comprising at least two parallel metal members, selected from the group consisting of metal plate and metal sheet, secured to aluminium stiffener sheet having a honeycomb structure arranged between said parallel metal members, wherein the aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight and a layer comprising nickel on an outer surface of said aluminium alloy clad layer.

3. A composite metal panel according to claim 1, wherein the corrugated aluminium stiffener sheet is in the form of turbulator sheet.

4. A composite metal panel according to claim 1, wherein the corrugated aluminium stiffener sheet is a formed sheet having a plurality of cup-like cavities, which cup-like cavities are aligned in parallel rows and whereby in alternating parallel rows the openings of the cup-like cavities are facing opposed directions.

5. A composite metal panel according to claim 1, wherein said layer comprising nickel further comprises bismuth in a range of at most 5% by weight.

6. A composite metal panel according to claim 1, wherein said layer comprising nickel is essentially lead-free.

7. A composite metal panel according to claim 1, wherein said layer comprising nickel has a thickness of not more than 2.0 micron.

8. A composite metal panel according to claim 1, wherein said layer comprising nickel is applied by means of electroplating.

9. A composite metal panel according to claim 5, wherein said layer comprising nickel is deposited by electroplating both nickel and bismuth using an aqueous bath comprising a nickel-ion concentration in a range of 10 to 100 g/l and a bismuth-ion concentration in the range of 0.01 to 10 g/l.

10. A brazing sheet product according to claim 1, wherein said aluminium clad layer further comprises magnesium in a range of at most 8%.

11. A composite metal panel according to claim 1, further comprising a layer comprising zinc or tin as a bonding layer between said outer surface of said aluminium clad layer and said layer comprising nickel.

12. A composite panel according to claim 11, wherein said bonding layer has a thickness of not more than 1 micron.

13. A composite metal panel according to claim 11, wherein said bonding layer comprising zinc or tin is applied by a zincate treatment or a stannate treatment respectively.

14. A composite metal panel according to claim 1, wherein the corrugated aluminium stiffener sheet is made from said aluminium brazing sheet product and said aluminium brazing sheet product comprises:

said core sheet made of said aluminium alloy having on at least one surface of said core sheet clad said aluminium alloy clad layer, said aluminium alloy clad layer being made of said aluminium alloy comprising silicon in an amount in the range of 2 to 18% by weight, said layer comprising nickel on the outer surface of said aluminium alloy clad layer, and a separately deposited metal layer on one side of said layer comprising nickel, wherein said separately deposited metal layer comprises a metal such that taken together said aluminium alloy clad layer and all layers of the aluminium brazing sheet product exterior thereto form a metal filler having a liquidus temperature in the range of 490 to 570° C.

15. A composite metal panel according to claim 14, wherein said layer comprises copper or copper-based alloy.

16. A composite metal panel according to claim 15, wherein said layer comprises at least 60% by weight copper.

17. A composite metal panel according to claim 14, wherein said layer has a thickness of not more than 10 micron.

18. A composite metal panel according to claim 1, wherein at least one of the parallel metal members is made from a metal selected from the group consisting of aluminium, aluminium alloy, titanium, plated or coated titanium, bronze, brass, stainless steel, plated or coated stainless steel, low-carbon steel, plated or coated low-carbon steel, high-strength steel, and plated or coated high-strength steel, nickel or nickel alloy.

19. A composite metal panel according to claim 1, wherein the parallel metal members have been secured or joined to the aluminium stiffener sheet by brazing.

20. A composite metal panel according to claim 1, wherein said layer comprising nickel has a thickness of not more than 1.0 micron.

21. A composite panel according to claim 11, wherein said bonding layer has a thickness of not more than 0.5 micron.

22. A composite metal panel according to claim 1, wherein both sides of said core sheet are respectively clad by the aluminium alloy clad layer and the layer comprising nickel on the outer surface of said aluminium alloy clad layer.

23. A composite metal panel according to claim 1, wherein the aluminium alloy of the aluminium alloy clad layer comprises silicon in an amount in the range of 5 to 14% by weight.

24. A composite metal panel according to claim 2, wherein both sides of said core sheet are respectively clad by the aluminium alloy clad layer and the layer comprising nickel on the outer surface of said aluminium alloy clad layer.

25. A composite metal panel according to claim 2, wherein the aluminium alloy of the aluminium alloy clad layer comprises silicon in an amount in the range of 5 to 14% by weight.

26. A composite metal panel according to claim 14, wherein both sides of said core sheet are respectively clad by the aluminium alloy clad layer and the layer comprising nickel on the outer surface of said aluminium alloy clad layer.

27. A composite metal panel according to claim 14, wherein the aluminium alloy of the aluminium alloy clad layer comprises silicon in an amount in the range of 5 to 14% by weight.

28. A composite metal panel according to claim 14, wherein said separately deposited metal layer comprises a metal such that taken together said aluminium alloy clad layer and all layers of the aluminium brazing sheet product exterior thereto form a metal filler having a liquidus temperature in the range of 510 to 550° C.

29. A composite metal panel according to claim 1, wherein the parallel metal members have been secured or joined to the aluminium stiffener sheet by brazing in the absence of a brazing flux material.

30. A composite metal panel according to claim 1, wherein the parallel metal members have been secured or joined to the aluminium stiffener sheet by a controlled atmosphere brazing process in the absence of a brazing flux material.

31. A method of manufacturing a rigid composite metal panel, comprising the steps of:
(a) providing parts, the parts comprising at least two parallel metal members selected from the group consisting of metal plate and metal sheet, and a corrugated aluminium stiffener sheet,
wherein the corrugated aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight, and a layer comprising nickel on an outer surface of said aluminium alloy clad layer;
(b) assembling the parts into an assembly such that the aluminium stiffener sheet is arranged between the parallel metal members;
(c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each parallel metal member and the corrugated aluminium stiffener sheet;
(d) cooling of the joined composite metal panel.

32. A method of manufacturing a rigid composite metal panel, comprising the steps of:
(a) providing parts, the parts comprising at least two parallel metal members selected from the group consisting of metal plate and metal sheet, and an aluminium stiffener sheet having a honeycomb structure arranged between said parallel metal members,
wherein the aluminium stiffener sheet is made from an aluminium brazing sheet product comprising a core sheet made of an aluminium alloy having on at least one surface of said core sheet clad an aluminium alloy clad layer, the aluminium alloy clad layer being made of an aluminium alloy comprising silicon in an amount in the range of 2 to 18% by weight and a layer comprising nickel on an outer surface of said aluminium alloy clad layer;
(b) assembling the parts into an assembly such that the aluminium stiffener sheet is arranged between the parallel metal members;
(c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each parallel metal member and the corrugated aluminium stiffener sheet;
(d) cooling of the joined composite metal panel.

33. A method of manufacturing a rigid composite metal panel, comprising the steps of:
(a) providing parts, the parts comprising at least two parallel metal members selected from the group consisting of metal plate and metal sheet, and a corrugated aluminium stiffener sheet,
wherein the corrugated aluminium stiffener sheet is made from an aluminium brazing sheet product and said aluminium brazing sheet product comprises:
a core sheet made of an aluminium alloy having on at least one surface of said core sheet clad an aluminium alloy clad layer, said aluminium alloy clad layer being made of an aluminium alloy comprising silicon in an amount in the range of 2 to 18% by weight, a layer comprising nickel on an outer surface of said aluminium alloy clad layer, and a separately deposited metal layer on one side of said layer comprising nickel, wherein said separately deposited metal layer comprises a metal such that taken together said aluminium alloy clad layer and all layers of the aluminium brazing sheet product exterior thereto form a metal filler having a liquidus temperature in the range of 490 to 570° C.;

(b) assembling the parts into an assembly such that the aluminium stiffener sheet is arranged between the parallel metal members;

(c) joining the assembly into a rigid composite metal panel by heating the assembly under a vacuum or in an inert atmosphere in the absence of a brazing-flux material at elevated temperature of less than 600° C. for a period long enough for melting and spreading of the molten filler to form a joint between each parallel metal member and the corrugated aluminium stiffener sheet;

(d) cooling of the joined composite metal panel.

* * * * *